March 3, 1942.    C. WASSERMAN    2,275,165
SYSTEM OF VOLTAGE REGULATION
Filed Jan. 27, 1939    3 Sheets-Sheet 1
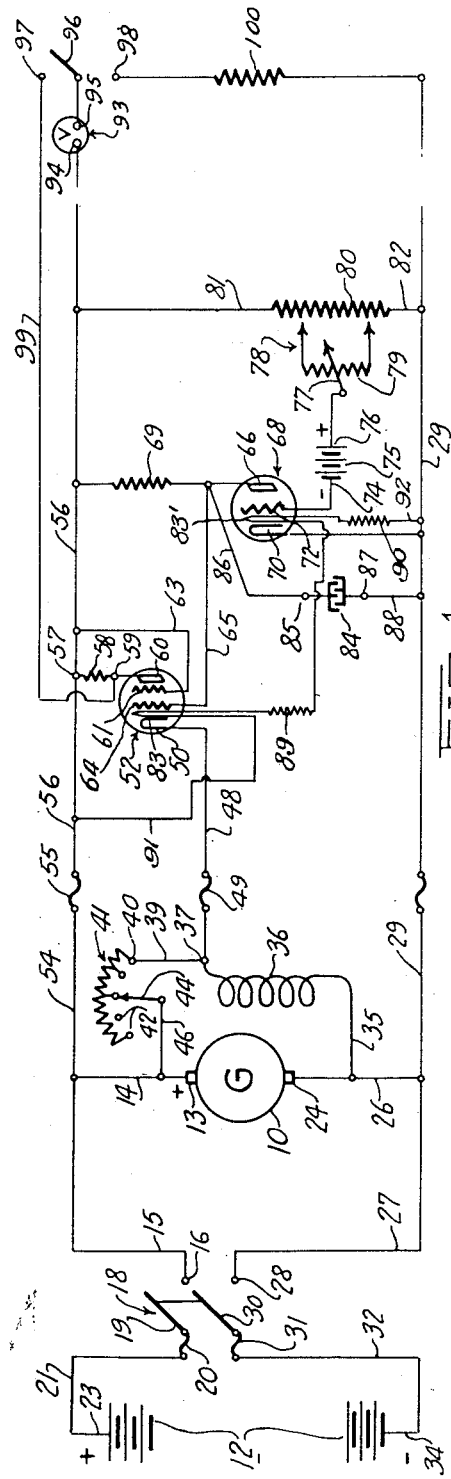
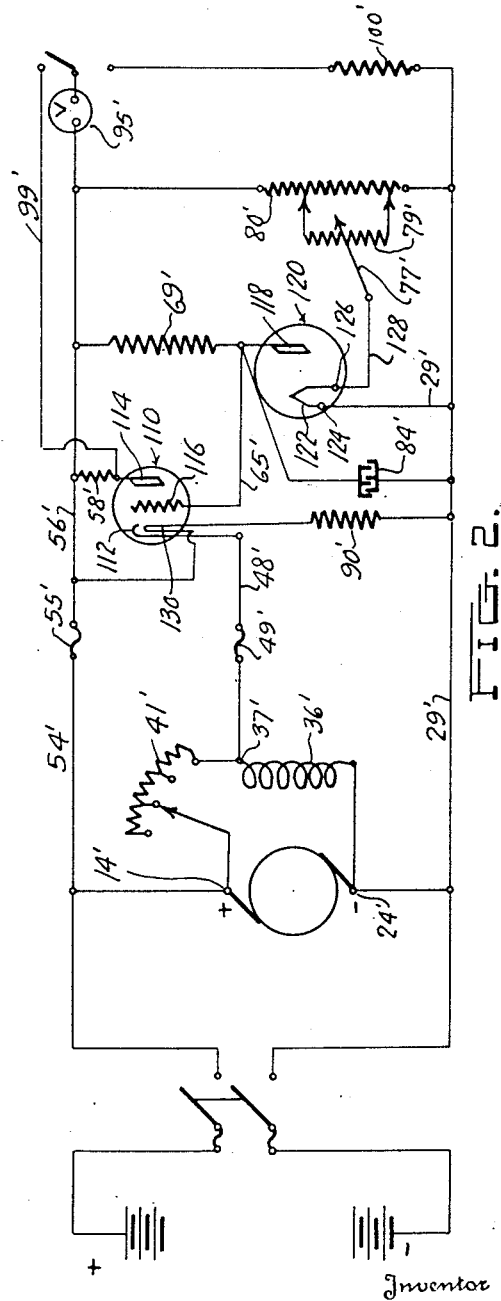
Inventor
Charles Wasserman
By J. T. Dowling
Attorney March 3, 1942.  C. WASSERMAN  2,275,165
SYSTEM OF VOLTAGE REGULATION
Filed Jan. 27, 1939  3 Sheets-Sheet 2

INVENTOR
*Charles Wasserman*
BY *J. T. Dowling*
ATTORNEY

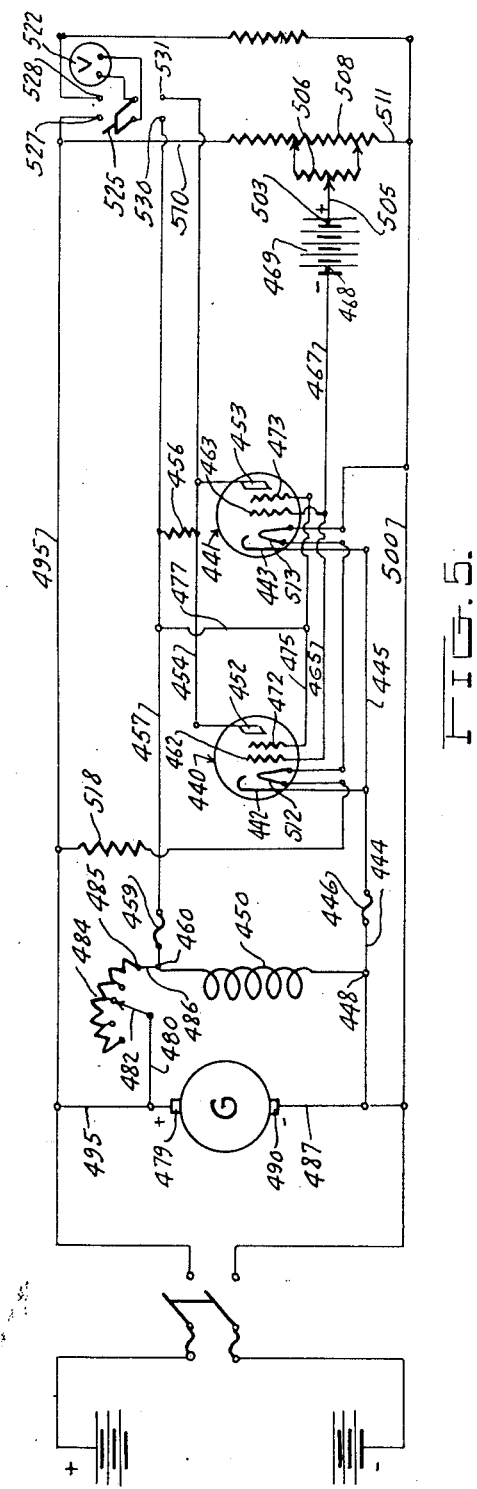

Patented Mar. 3, 1942

2,275,165

UNITED STATES PATENT OFFICE 2,275,165

SYSTEM OF VOLTAGE REGULATION

Charles Wasserman, Baltimore, Md.

Application January 27, 1939, Serial No. 253,059

5 Claims. (Cl. 171—312)

This invention relates to a system of regulation for electric current producing apparatus and more particularly to a system including an electronic device employed for maintaining a dynamo-electric machine characteristic at a constant value.

The invention includes an electric generating system wherein the output voltage is maintained constant by novel regulating means which will respond to slight variations in operative conditions and accurately compensate therefor.

The invention comprehends a novel arrangement in the electrical connections of the component elements of electron tubes for maintaining a constant voltage in a generating system without the necessity of continuously acting relays and other instrumentalities.

An object of the invention is the provision of inexpensive electronic devices of small current carrying capacity so connected with a direct current generator as to maintain the generator output voltage within very close limits under all conditions of operation.

Another object of the invention is the utilization of an electronic device adapted to amplify any variation in the generator voltage and apply said amplified variations to a control electrode of an associated electronic device for maintaining the voltage of the system at a constant value.

Another object of the invention is to provide a generating system particularly adapted to maintain a plurality of storage batteries in a charged condition, the output voltage of the generator being so regulated that objectionable changes in voltage are eliminated whereby the life of the storage batteries is materially increased.

A further object of the invention is the interconnection of a plurality of electron tubes with a generator for regulating the intensity of the current flow through the field windings thus maintaining the generator voltage uniform irrespective of variation in load or changes of speed in the motive power driving the generator.

A further object of the invention is to provide a voltage regulator using an electron tube of low current capacity of the type used in ordinary radio receiving circuit and wherein the power used for the operation of the tube is obtained solely from the apparatus or device it regulates.

Further objects and advantages are within the scope of this invention such as relate to the arrangement, operation and function of the related elements of the system, to various details of construction and to manufacture and numerous other features as will be apparent from a consideration of the specification and drawings of a form of the invention, which may be preferred, in which:

Figure 1 is a diagrammatic illustration of a form of circuit connections of the system of the invention.

Figure 2 is a diagrammatic illustration of a modified form of circuit connections of the system of the invention.

Figure 5 is a similar view showing my voltage regulator circuit without an amplifier.

Figure 3:
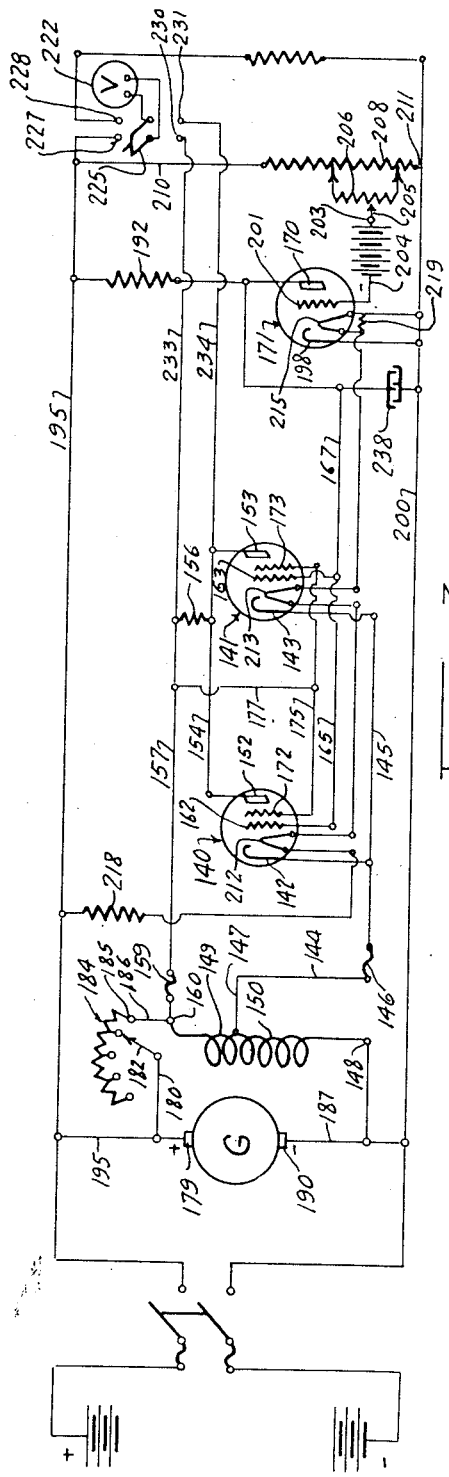
Figure 3 is a view similar to Figure 2, showing the resistor and part of field in parallel with a plurality of tubes.

While the invention has been illustrated as incorporated in a system for controlling the voltage of a generator used for charging a plurality of storage batteries, but it is to be understood the principles of regulation disclosed are contemplated to be used wherever the same may be found to have utility.

Referring to Figure 1, a direct current self excited generator adapted to supply the desired voltage and charging current necessary to maintain a plurality of storage cells in proper charged condition is shown. The generator armature 10 has its positive brush or terminal 13 connected by means of leads 14 and 15 to the stationary contact 16 of the double pole switch 18, the stationary contact 16 adapted to be engaged by the switch blade 19, the latter being connected through suitable fuses 20 and through a lead 21 to the positive terminal 23 of the storage battery cells 12. The negative brush or armature terminal 24 is connected by means of leads 26 and 27 to the stationary contact 28 of the double pole switch 18. The stationary switch contact 28 is adapted to be engaged by the movable switch blade 30, being connected through fuse 31 and lead 32 to the negative terminal 34 of the storage battery cells 12.

The generator herein illustrated is of the shunt field type and the terminal 35 of the field winding 36 is connected to the negative brush 24 while the other field winding terminal 37 is connected by lead 39 to terminal 40 of the variable field rheostat 41 which is provided with a plurality of taps 42 adapted to be engaged by a movable contacting arm 44. The contacting arm 44 being connected by lead 46 to the positive brush 13 of generator 10. Movement of the arm 44 will serve to change the resistance connected in series with the windings of generator field 36, thereby providing a variable resistance serving to regulate the generator field strength.

The terminal 37 of the field winding 36 is connected through a lead 48 and suitable fuse 49 to the cathode element 50 of an electron tube 52. It should be noted that positive brush 13 of the generator connected to lead 14 is also connected through lead 54 a suitable fuse 55 and a lead 56 to the terminal 57 of a suitable high resistance 58, its other terminal 59 being connected to the anode element 60 of electron tube 52, thus the electron tube is connected between the generator field winding terminal 37 and the positive brush 13 as to shunt the rheostat 41. The electron tube 52 is provided with a grid 61 connected by means of lead 63 to lead 56 connected to the positive terminal of the generator, this tube also includes the control grid 64 connected by lead 65 to the anode 66 of the electron tube 68.

The electron tube 68 which may be referred to as the amplifying tube is connected with a suitable resistance across the positive and negative terminals of the generator having its anode 68 connected to the lead 56 constituting the positive generator line through a suitable high resistance 69, while the cathode 70 is connected to the negative line 29 which is connected to negative generator brush 24 by lead 26.

In order that the electron tube 68 will be responsive to very slight variations in line voltage and thereby cause the operation of means to compensate for said changes, the tube 68 is provided with a control grid 72 connected to the negative terminal 74 of a constant source of potential such as a dry cell battery 75. The positive terminal 76 of this battery being connected to the movable arm 77 of a potentiometer 78 which in the form shown includes the semi-adjustable resistor 79 having the end terminal connected across a suitable resistance 80 which in turn is connected across the generator terminals by suitable lead 81 to positive line 56 and lead 82 to the negative line 29. This arrangement of connections permits a wide range of adjustability in the voltage derived through the potentiometer, which voltage is in opposition to the constant source of potential 75 so that the alegbraic sum of such voltages is applied to grid 72.

A condenser 84 of suitable capacity has one of its terminals 85 connected to the anode element 66 by lead 86 while its other terminal 87 is connected by lead 88 to the negative line 29.

The electron tubes 52 and 68 in the form of the invention shown in Figure 1 are of the indirectly heated cathode type and the heating element 83 of tube 52 as well as the heating element 83' of cathode tube 68 in the embodiment shown are connected in series and in turn are connected through suitable resistances 89 and 90 across the terminals of the generator by lead 91 to the positive line 56 and by lead 92 to the negative line 29. The resistance 89 and 90 being used to limit the flow of current through the heating element, whereby the heating means for the cathode elements of each electron tube are energized by the regulated voltage of the system thereby assuring the stability of the electronic emission of the devices used.

For the purpose of indicating the value of the space current passing through the electron tube 52 by indicating the potential drop across plate resistor 58 as well as the value of the regulated voltage a suitable instrument is used such as a voltmeter 93. The voltmeter terminal 94 is connected to the positive lead 56 while its other terminal 95 is connected to the switch blade 96 adapted to be moved into contacting engagement with stationary contacts by 97 and 98. The stationary contact 97 is connected by lead 99 to the anode or plate element 60 of electron tube 52, so that if the blade 96 is in contact with terminal 97 the voltmeter terminals will measure the drop across resistor 58, while stationary contact 98 is connected through a suitable high resistance 100 to the negative generator line 29.

Engagement of switch blade 96 with contact 97 will establish a circuit through the measuring meter 93 giving an indication of the plate current of tube 52, while engagement of switch blade 97 with contact 98 will establish a circuit including meter 93 whereby the value of the regulated voltage is indicated thereby.

The operation of the form of the invention hereinbefore described may be summarized as follows:

The electronic regulator or electron tube 52 which is connected in series with the generator field winding 36 by lead 48 shunting the field rheostat 41 constitutes in effect an automatic variable field resistance or changeable current path. The change in this resistance is controlled by the value of the line voltage thereby compensating for variations in the predetermined generator line or output voltage by changing the generator field strength. This type of control is obtained by making the voltage potential applied to control grid element 64 a function of the generator line voltage and thereby changing the bias of this grid element according to variations of the line voltage, thus changing the plate or space current through tube 52 or the impedance of tube 52. In the form shown in Figure 1 the voltage applied to the grid element 64 corresponds to the amplified variations of the line voltage, which amplification is obtained by the use of the electron tube 68 through the connection of the grid element 64 of tube 52 to the circuit of the plate element or anode 66 at its interconnection with resistance 69.

The interconnection of the electron tubes 52 and 68 regulates the line voltage of the generator due to the fact that changes in the regulated voltage are applied to the grid 64 so that comparative large variations in plate current are present in such tubes whereby the tube 52 functions as means to decrease the effective total resistance in series with the generator winding 36 when the generator line voltage drops or falls below a predetermined value, and to increase said effective total resistance when the regulated line voltages increase. The tubes 52 and 68 compensating for such changes by changing the generator field excitation.

It is important to note that the voltage drop across the resistance 80 will vary directly as the voltage of the generator varies and therefore the voltage drop across the adjustable resistance 79 will be a function of the generator line voltage whereby the voltage applied to the control grid 72 of the amplifying tube 68 is entirely dependent on the line voltage of the generator. Due to the negative connection of the constant potential battery 75 with the grid and the positive terminal connected to the potentiometer arm 77, the battery potential opposing the potentiometer potential, the bias of the grid 72 at normal line voltage can be regulated by moving the potentiometer arm 77 so as to impress upon the grid 72 a proper slight negative bias, the movement of the arm concurrently controlling the regulating effect of the tube 52 by reason of the adjustment of the potential of the grid 72. The plate current through the tube 52 can be measured through the use of meter 93 by moving switch blade into engagement with contact 97.

If the line or regulated voltage decrease from the predetermined normal value for any reason whatever, this decrease in voltage will also be manifested by decrease in the voltage between the potentiometer arm 77 and the negative line and will cause the negative bias of the grid 72 to increase with reference to the potential of the cathode 70, due to the fact that the potential applied to the grid 72 is the algebraic sum of these two voltages whereby the effective resistance or impedance of the amplifying tube 68 will be increased and consequently the plate current will decrease. This decrease in the plate current of tube 68 which flows through the plate circuit to which the grid 64 of tube 52 is connected, will cause a decrease in the voltage potential applied to the grid 64, thereby increasing the plate current through the regulating tube 52 with the consequent result that the effective total resistance in series with the generator winding 36 is decreased. This decrease in the effective total resistance in series with the field winding 36 will cause an increase in the flow of current therethrough and consequently the voltage of the generator is compensated or increased by increasing the field excitation of the generator.

The amplification of the variation of the line voltage is obtained due to the fact that the voltage between the cathode and plate is the voltage of the line and when a decrease in line voltage takes place, this applied voltage also decreases which further tends to decrease the plate current flowing through the amplifying tube 68, so that a decrease in the line voltage is manifested by an accumulative effect serving to control the value of the plate current in tube 68, which accumulative effect is applied to the control grid 64 of tube 52. In addition, due to the connection across the regulated line voltage of the heating element 83 of the regulator tube 52 as well as the heating element 83' of the amplifying tube 68, a decrease in the line voltage will also decrease the heating effect of these elements on the respective cathodes and therefore will also tend to decrease the plate current flowing through the tubes, thus further increasing the sensitiveness of the regulating system for compensation of changes in generator voltage.

In the form of the embodiment illustrated in Figure 1, the electron tube 52 includes a second grid 61 which is connected to the positive line of the generator, this grid being used for increasing the sensitiveness of the regulating tube 52, as this grid serves to decrease the plate resistance or space charge effect of the regulating tube 52. The condenser 84 connected across the amplifying tube 68 is used in this form of the invention to provide a delayed effect in the regulation and to prevent oscillation. Any changes in the space current of the amplifying tube 68 will also serve to change the potential across the amplifying tube and consequently it will change the charge of the condenser. This action tends to delay the change in plate voltage until the condenser is charged to a new value.

Should the line or regulated voltage increase from predetermined normal value, this increase will be manifested in the algebraic sum of potential which is applied to the control grid 72, decreasing the negative bias and thereby decreasing the resistance or impedance of the amplifying tube 68. This decrease will cause the plate current to be increased and the potential applied to the control grid 64 of the regulating tube 52 will be increased, thereby causing that the flow of current through the regulating tube 52 be decreased, and therefore the effective total resistance in series with the generator winding 36 is increased. The increase in the effective total resistance with the generator winding will cause a decrease in the flow of current through this winding whereby the line voltage is compensated by a decrease in the field excitation of the generator.

In the form of the invention shown in Figure 1, I have found it very effective for purpose of maintaining the generator line voltage constant or having fluctuation of very small amplitude which will not exceed a variation of $\frac{1}{10}$ of 1% above or below the normal voltage for very short intervals, a regulation which is very desirable in floating storage batteries used for standby or emergency service, which life expectancy is predicated upon the maintenance of a constant charging voltage per cell, to employ electron tubes having the electric characteristics possessed by tubes such as radio tube known at present as "type 48" to perform the function of the regulating tube 52 and radio tube known as "type 75" to perform the function of the amplifying tube 68 which are types now commonly used in radio broadcasting receiving circuits.

I have also found that the best results can be obtained with the electron tubes mentioned by using for the resistance 69 a value of approximately 400,000 ohms, and for resistance 79 and 80 value of approximately 1,000 and 5,000 ohms respectively; however, these values are not absolutely critical and can be varied. The value of the "C" bias to obtain the proper sensitivity may vary from 12½ volts to 125 volts depending upon the characteristics of the electron tubes used and the stability of the operation desired. The particular values hereinbefore mentioned are designed to supply the floating or charging current for a storage battery ranging from at least 50 cells to a larger number.

Figure 2 shows a modified form of the system of regulation wherein a tube of the indirectly heated cathode type is used as generator field regulation electron tube, while the amplifying tube interconnected therewith is an electron tube of the direct heated type. In this form the regulating tube 110 has its cathode 112 connected by lead 48' and through a suitable fuse 49' to the terminal 37' of the generator field winding 36', while the anode or plate 114 is connected to the resistance 58' which in turn is connected through lead 56', through fuse 55' and lead 54' to the positive terminal 14' of the generator, thereby connecting the electron tube 110 in shunt with the field rheostat 41'. The control grid 116 is connected through lead 65' to the plate 118 of an amplifying tube 120. The plate 118 is connected to resistance 69' which in turn is connected to the lead 56'. The cathode 122 has its terminal 124 connected by lead 29' to the negative terminal 24' of the generator and the cathode terminal 126 is connected by lead 128 to the potentiometer arm 77' adapted to engage the adjustable resistance 79' cooperating with the resistance 80' connected across the line or regulated generator voltage. The heating filament 130 of the regulating tube 110 is connected in series with resistance 90' and across the line voltage of the generator. In this form of the invention, a similar type of connections are used with a voltmeter 95' for indicating the plate current of the regulating tube 110, as well as the value of the regulated voltage and for the purpose of preventing oscillation in the system the condenser 84' is connected across the amplifying tube 120.

The voltage regulation in this form is obtained through the changes in the heating of the cathode 122, and changes in the voltage applied to the tube 120 which accumulation causes variations in the value in the plate current of the amplifying tube 120. The variation in the plate current of the amplifying tube 120 in turn serve to change the effective voltage applied to the control grid 116, and thereby controlling the generator field excitation.

Should the line or regulated voltage decrease from a predetermined normal value, the heating effect of the cathode 122 will be decreased and at the same time the voltage applied across the amplifying tube 120 will also be decreased, whereby the impedance of the tube will be increased, decreasing the plate current flowing through the circuit to which the control grid 116 of the regulating tube 110 is connected. This will cause a decrease in the voltage potential applied to the control grid 116, thereby increasing the plate current through the regulating tube 110 and consequently decreasing the effective total resistance in series with the winding 36'. This decrease in the total resistance in series with the field winding 36' will serve to increase the field excitation and thereby increasing the line voltage. When an increase in the line voltage occurs, opposing action will take place, as the heating effect of the cathode 122 will be increased, thereby increasing the plate current of regulating tube 120 and consequently decreasing the potential to the grid 116, thereby increasing the impedance of regulating tube 120, which in turn will function to decrease the value of current through the generator winding 36'. It is important to note that in the form of the invention shown in Figure 2, the constant source of potential or "C" battery has been dispensed with and that the heating element 130 for the cathode 112 of the regulating tube 110 is connected across the regulated source.

It will be noted that in both forms of the invention disclosed, the space or plate currents and cathode heating for the electronic devices are obtained directly from the regulated source and that only two adjustments are necessary to regulate the operation of the system which consists in the adjustment of the field rheostat 41 and the adjustment of the potentiometer to provide the proper intensity of field excitation to produce the desired voltage for the load used.

In the form of the invention illustrated in Figure 3, the regulation is accomplished by connecting a plurality of regulating tubes in parallel with a portion of the generator field winding in combination with an amplifying tube interconnected therewith and connected across the generator terminals. In this form of invention, the regulating tubes 140 and 141 have their respective cathodes 142 and 143 interconnected by lead 145 connected by lead 144 through fuse 146 to the terminal or tap 147 of the generator field winding 150. The respective anodes or plates 152 and 153 are interconnected by means of lead 154 which in turn is connected through a suitable resistance 156 to lead 157 connected through fuse 159 to the positive terminal 160 of the generator field winding 150, thereby connecting the electron tubes 140 and 141 in shunt or in parallel with a portion 149 of the field winding 150. The control grids 162 and 163 of tubes 140 and 141 are interconnected by means of a lead 165, and in turn connected by lead 167 to the anode or plate 170 of the amplifying tube 171. The secondary grids 172 and 173 of the regulations tubes are interconnected by means of a lead 175 and in turn connected by means of lead 177 to lead 157, the latter being, as hereinbefore mentioned, connected to the positive terminal 160 of the generator winding 150.

In this form of the invention the positive terminal of the generator 179 is connected by means of lead 180 to the movable contacting arm 182 of the field rheostat 184, the latter having one terminal 185 connected by lead 186 to the field winding 150. The terminal 148 of the field winding is connected by means of lead 187 to the negative terminal 190 of the generator, thus connecting the field winding across the generator armature in series with the field rheostat.

The plate or anode 170 of the amplifying tube 171 is connected through resistance 192 and lead 195 to the positive terminal 179 of the generator. The cathode 198 of electron tube 171 is connected to the negative terminal 199 of the generator by lead 200. The control grid 201 of amplifying tube 171 is connected to the negative terminal 204 to a suitable source of constant potential or "C" battery and the positive terminal 203 of this battery being connected to the potentiometer arm 205 cooperating with the semi-adjustable resistance 206, the latter having the end terminals adapted to be connected to portions of the resistance 208. The resistance 208 is connected across the generator terminals 190 and 179 through leads 210 and 211 to the leads 195 and 200. The electron tubes 140, 141 and 171 in the form of the invention shown in Figure 3 are of the indirectly heated cathode type and the heating elements 212, 213 and 215 are connected through resistance 218 across the generator terminals. Across the terminals of the heating element 215 of the amplifying tube 171 is connected a suitable resistance 219 for the purpose of regulating the heating effect of the current flowing through this heating element.

In the form of the invention shown in Figure 3 the voltmeter 222 is connected to a double pole double throw switch 225 adapted to engage the terminals 227 and 228 for the purpose of indicating the value of the regulated voltage. The switch 225 is also adapted to engage contacts 230 and 231 which are connected by means of lead 233 and 234 to leads 154 and 157 so that when the switch 225 is in engagement with contacts 230 and 231 the voltmeter will measure the drop across the resistance 156 in this manner indicating the value of the space current passing through the electron tubes 140 and 141.

In order to provide a delayed effect in the regulation and to prevent oscillation particularly when the generator is connected or disconnected to the load, the condenser 238 is connected across the amplifying tube 171.

The voltage regulation in the embodiment shown in Figure 3 is obtained through changes in the effective current bypath formed by the electron tubes which serve to change the effective field excitation of the generator. Should the line of regulated voltage decrease from a predetermined normal value, this decrease in voltage will be manifested by decreasing the voltage between the potentiometer arm 205 and the negative line 200 which will cause the negative bias of grid 201 to increase with reference to the potential of the cathode 198 consequently causing the plate current flowing through tube 171 and resistance 192 to decrease. This decrease in the plate current of tube 171 will effect a decrease in the voltage potential applied to the control grids 162 and 163 of the regulating tubes 140 and 141 thereby increasing the plate current passing therethrough. This increase in the plate current through the regulating tubes 140 and 141 will result in that the current flowing through the effective bypath in parallel with the field section 149 will be increased and thereby increase the flow of current through the remaining major portion of the exciting field 150. Consequently such decrease in voltage of the generator is compensated for or increased by amplifying the field excitation of the main portion of the field winding.

Should an increase in the line or regulated voltage take place, the reverse of the above described action occurs and less current will flow through the regulated bypath formed by the regulating tubes 140 and 141 thus decreasing the field excitation of the major portion of the dynamo field winding 150.

The amplification of the variations of the line voltage in the form of the invention shown in Figure 3 is also obtained due to the interconnection of the amplifying tube 171 across the generator terminals.

Figure 4:
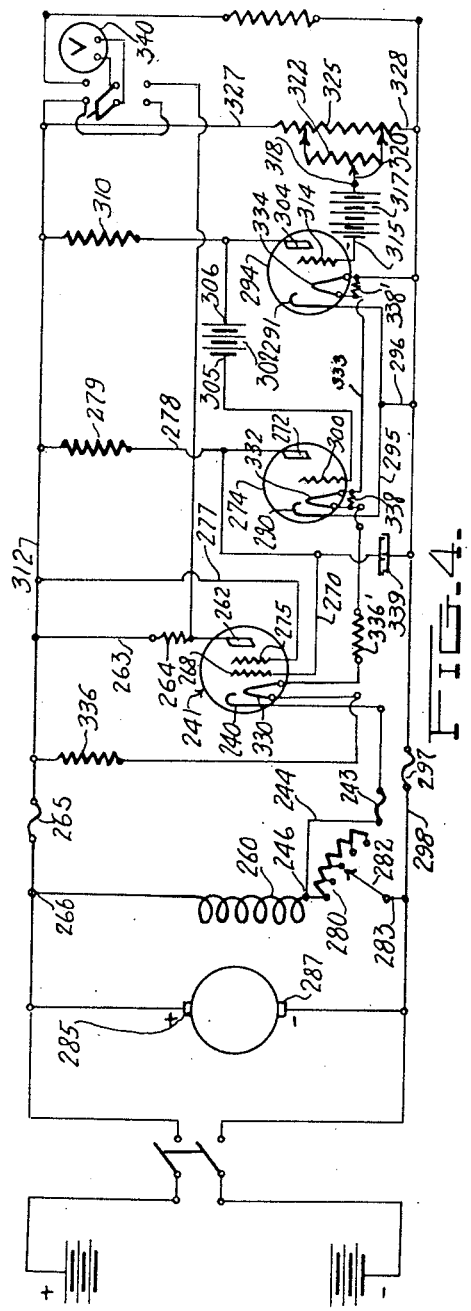
Figure 4 is a similar view showing resistor and field in parallel with two tubes also in parallel.

In the form of the invention shown in Figure 4, a regulating tube is connected across the terminals of the field winding while two amplifier type tubes interconnected therewith are used for the purpose of increasing the sensitiveness of regulation of the system. In this form, the cathode 240 of the regulating tube 241 is connected through fuse 243 by lead 244 to the negative terminal 246 of the generator winding 260, while the anode or plate 262 is connected through a suitable resistance 264 by lead 263 and a fuse 265 to the positive terminal 266 of the field winding 260 thereby the electron tube 241 forms a parallel circuit with the field winding 260. The control grid 268 of tube 241 is connected by lead 270 to the anode 272 of the amplifier tube 274, the latter is in turn connected by means of lead 278 to a suitable resistance 279, which by means of line 312 and fuse 265 is connected to the positive terminal 285 of the generator. The secondary grid 275 of the regulating tube 241 is connected by means of lead 277 to the positive terminal 266 of the generator winding 260 and to positive terminal 285 of the generator by line 312.

Connected in series with the field winding 260 is the field rheostat 280 having one terminal connected to the negative field winding terminal 246 and the movable rheostat arm 282 connected by means of lead 283 and 298 to the negative terminal 287 of the generator armature. The positive terminal of the generator armature 285 is connected to the terminal 266 of the field winding 260 thereby the field winding 260 and field rheostat 280 form a circuit across the armature or generator terminals.

The cathode 290 of the amplifier tube 274 is interconnected to cathode 291 of another amplifier tube 294 by lead 295 which in turn is connected by lead 296 through fuse 297 and conductor 298 to the negative terminal 287 of the dynamo. The control grid 300 of tube 274 is interconnected through a suitable source of constant potential or "C" battery 302 to plate 304 of tube 294 with the negative terminal 305 connected to the grid and its positive terminal 306 to the plate. The plate 304 of the amplifier tube 294 is connected through a suitable resistance 310 by means of line 312 to the positive terminal 285 of the generator. The control grid 314 of tube 294 is directly connected to the negative terminal 315 of a constant source of potential or "C" battery 317 which has its positive terminal 318 connected to a movable potentiometer arm 320 coacting with the adjustable resistance 322 having its end terminals adapted to be connected across portions of resistance 325 which latter connect across the terminal of the generator by leads 327 and 328 respectively to positive line lead 312 and negative line lead 298.

The electron tubes 241, 274 and 294 are of the indirect heated type and the heating elements 330, 332 and 334 are connected in series through resistances 336 and 336' forming a circuit across the dynamo terminals. This circuit includes from the generator positive terminal 285 through fuse 265, line 312 to a terminal of resistance 336 and through its other terminal to the heating element 330 and hence to resistance 336' through heating element 332 and lead 333 to heating element 334, the latter having one terminal connected to the negative terminal of the generator 287 through line 298. To further regulate the heating effect of the elements 332 and 334 of tubes 274 and 294, suitable resistances 338 and 338' are connected across the terminals of these heating elements, a voltmeter 340 connected in a similar manner to the one shown in Figure 3 is employed to indicate the value of the line voltage and the value of the space current passing through the electron tube 241. A condenser 339 of suitable capacity is connected across the electron tube 274 for the purpose of preventing oscillation of the systems when the generator is connected or disconnected to the load.

The regulation is obtained in the embodiment shown in Figure 4 by changes in the resistance of the bypath formed by the electron tube 241 connected across the generator field. The resistance of this bypath through the tube 241 is dependent on accumulative changes in the line voltage which are materially amplified by the interconnection of the electron tubes 274 and 294 across the generator terminals.

It should be noted that in the embodiment disclosed in Figure 4 any decrease in the generator line voltage from a predetermined normal value will be manifested by a decrease in the voltage between the potentiometer arm 320 and the negative line 298 which will cause the negative bias of the grid 314 to increase in value with reference to the potential of the cathode 291, consequently causing the plate current flowing through tube 294 and resistance 310 to decrease. This decrease in the plate current through tube 294 will decrease the negative bias impressed on the control grid 300 by the constant source of potential or C battery 302 causing the plate current flowing through tube 274 and resistance 279 to increase. This accumulative increase in the plate current through tube 274 will be manifested in an increase in the potential applied to the control grid 268 of the regulating tube 241 causing the plate current flowing through tube 241 to decrease. This decrease in the plate current through the regulating tube 241 will result in that the current flowing through the effective bypath across the field winding 260 will decrease and thereby increase the flow of current through the exciting field winding 260 of the generator. It can be seen that any decrease in the voltage of the generator is compensated for or increased by the accumulative effect of the electronic tubes 274 and 294 on the regulating tube 241 by decreasing the effective bypath formed thereby thus increasing the field excitation of the generator. The reverse action will take place whenever the line voltage is increased from its normal value. In this embodiment, a very extremely sensitive regulation is secured due to the accumulated effect produced by the interconnection of the amplifying tubes 294 and 274 which control the current by-passed through the regulating tube 241.

In the embodiment illustrated in Figure 5, the regulation is accomplished by connecting a plurality of regulating tubes in parallel with the dynamo field winding. In this embodiment the regulating tubes 440 and 441 have their respective cathodes 442 and 443 interconnected by lead 445 and connected by lead 444 through fuse 446 to the negative terminal 448 of the dynamo field winding 450. The respective anodes or plates 452 and 453 are interconnected by lead 454. The lead 454 in turn is connected through a suitable resistance 456 to lead 457, the latter connected through fuse 459 to the field winding positive terminal 460 thereby forming a circuit including the electron tubes 440 and 441 connected in parallel with the field winding 450. The control grids 462 and 463 of tubes 440 and 441 are interconnected by means of a lead 465 and in turn connected by lead 467 to the negative terminal 468 of a constant source of potential or "C" bias 469. The secondary grids 472 and 473 of the regulating tubes 440 and 441 are interconnected by means of a lead 475. The lead 475 is in turn connected by means of lead 477 to lead 457, the latter being, as hereinbefore mentioned, connected to the positive terminal 460 of the generator winding 450.

The positive terminal 479 of the dynamo is connected by means of lead 480 to the movable contacting arm 482 of the field rheostat 484, the latter having one terminal 485 connected by lead 486 to the field winding 450. The terminal 448 of the field winding is connected by means of lead 487 to the negative terminal 490 of the dynamo, thus connecting the field winding across the dynamo armature in series with the field rheostat 484.

The positive terminal 503 of the constant source of potential or battery 469 is connected to the potentiometer arm 505 cooperating with the semi-adjustable resistance 506, the latter having its terminals adapted to be connected to portions of the resistance 508. The resistance 508 is connected across the generator terminals 490 and 479 through leads 510 and 511 to the leads 495 and 500.

The electron tubes 440, 441 in the form of the invention shown in Figure 5 are of the indirectly heated cathode type and the heating elements 512 and 513 are connected in series and with a resistance 518 forming a circuit connected across the generator terminals 479 and 490.

In the embodiment illustrated in Figure 5 the voltmeter 522 is connected to a double pole double throw switch 525 adapted to engage the terminals 527 and 528 for the purpose of indicating the value of the regulated voltage. The switch 525 is also adapted to engage contact 530 and 531 which are connected by means of lead 533 and 534 to leads 454 and 457 so that when the switch 525 is in engagement with contacts 530 and 531 the voltmeter will measure the drop across the resistance 456 in this manner indicating the value of the space current passing through the electron tubes 440 and 441.

The voltage regulation in the embodiment shown in Figure 5, is obtained through changes in the effective resistance or the current flowing through bypath circuit formed by the electron tubes thus changing the effective field excitation of the generator. Should the line of regulated voltage decrease from a predetermined normal value, this decrease in voltage will be manifested by decreasing the voltage between the potentiometer arm 505 and the negative line 500 which will cause the normal impressed negative bias grids 462 and 463 to increase with reference to the potential of the cathodes 442 and 443 consequently causing the effective resistance of tubes 440 and 441 to increase and thus the plate current flowing through these tubes to decrease.

This increase in the resistance of the bypath circuit and the corresponding decrease in the plate current through the regulating tubes 440 and 441 will in effect decrease the current flowing through the effective bypath shunting the field winding 450 and thereby increased the flow of current through the exciting field winding 450. Consequently, such decrease in the generator line voltage is compensated for or increased by amplifying the excitation of the generator field winding.

Should an increase in the line or regulated voltage take place the reverse of the above described action occurs, as greater current will be flowing through the bypath formed by the regulating tubes 440 and 441, thereby decreasing the field excitation of the dynamo field winding 450, and thus compensating for the increase in line voltage.

It is apparent that, within the scope of the invention, modifications and different arrangements may be made other than is herein disclosed, and the present disclosure is illustrative merely, the invention comprehending all variations thereof.

Having thus described my invention, what I claim as new is:

1. In combination, a dynamo-electric machine having an exciting field winding; means for regulating the current flow through said winding; an electronic device forming a bypath around said means; a control electrode for regulating the effective impedance of the space current path of said device, said control electrode being connected to the anode circuit of a second electronic device; the second electronic device being connected across the terminals of said dynamo-electric machine; a resistor connected across the terminals of said dynamo-electric machine in parallel with said second electronic device; a constant source of potential; a control electrode for the second electronic device connected through said constant source to a portion of said resistor whereby the potential drop in said resistor controls the potential of said electrode; and heating means for said electronic devices connected across the terminals of said dynamo-electric machine.

2. A self contained voltage regulating apparatus, for controlling the voltage characteristics of a dynamo-electric machine having an exciting field winding and means for regulating the current flow through said winding, said regulating apparatus comprising an electronic device providing a bypath around said means, a control electrode for regulating the effective impedance of the space current path of said device, said control electrode being connected to the anode circuit of a second electronic device, the second electronic device being connected across the terminals of said dynamo-electric machine, a resistor connected across the terminals of said dynamo-electric machine in parallel with said second electronic device, a source of potential, means for controlling said source of potential, a control electrode for the second electronic device connected through said source of potential to a portion of said resistor whereby the potential drop in said resistor controls the potential of said electrode, and heating means for said electronic devices connected across the terminals of said dynamo-electric machine.

3. A self contained voltage regulating apparatus, for controlling the voltage characteristics of a dynamo-electric machine having an exciting field circuit, consisting of both an exciting field winding and means for regulating the current flow through said winding; an electronic device forming a bypath around a portion of said exciting field circuit; a control electrode for regulating the effective impedance of the space current path of said device, said control electrode being connected to the anode circuit of a second electronic device, the second electronic device being connected across the terminals of said dynamo-electric machine, a resistor connected across the terminals of the said dynamo-electric machine in parallel with said second electronic device, a source of potential, means for controlling said source of potential, a control electrode for the second electronic device connected through said source of potential to a portion of said resistor whereby the potential drop in said resistor controls the potential of said electrode, and heating means for said electronic devices connected across the terminals of said dynamo-electric machine.

4. In combination, a dynamo-electric machine having an exciting field circuit, consisting of both an exciting field winding and means for regulating the current flow through said winding; an electronic device forming a bypath around a portion of said exciting field circuit; a control electrode for regulating the effective impedance of the space current path of said device, said control electrode being connected to the anode circuit of a second electronic device, the second electronic device being connected across the terminals of said dynamo-electric machine, a resistor connected across the terminals of said dynamo-electric machine in parallel with said second electronic device, a source of potential, means for controlling said source of potential, a control electrode for the second electronic device connected through said source of potential to a portion of said resistor whereby the potential drop in said resistor controls the potential of said electrode, and heating means for said electronic devices connected across the terminals of said dynamo-electric machine.

5. In combination, a dynamo-electric machine having an exciting field circuit, consisting of both an exciting field winding and means for regulating the current flow through said winding; an electronic device forming a bypath around a portion of said exciting field circuit; a control electrode for regulating the effective impedance of the space current path of said device, said control electrode being connected to the anode circuit of a second electronic device, the second electronic device being connected across the terminals of said dynamo-electric machine, a resistor connected across the terminals of said dynamo-electric machine in parallel with said second electronic device, a constant source of potential, a control electrode for the second electronic device connected through said constant source to a portion of said resistor whereby the potential drop in said resistor controls the potential of said electrode, and heating means for said electronic devices connected across the terminals of said dynamo-electric machine.

CHARLES WASSERMAN.